(12) United States Patent
Renz et al.

(10) Patent No.: US 8,336,681 B2
(45) Date of Patent: Dec. 25, 2012

(54) BRAKE CALIPER AND ASSOCIATED PRODUCTION METHOD

(75) Inventors: Ralph Renz, Sindelfingen (DE); Oliver Moessinger, Forst (DE); Rainer Wuest, Wiernsheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 493 days.

(21) Appl. No.: 12/474,320

(22) Filed: May 29, 2009

(65) Prior Publication Data

US 2010/0038190 A1    Feb. 18, 2010

(30) Foreign Application Priority Data

Aug. 16, 2008 (DE) .......................... 10 2008 038 035

(51) Int. Cl.
*F16D 65/02* (2006.01)
(52) U.S. Cl. ..................................................... 188/73.1
(58) Field of Classification Search .......... 188/72.3, 188/73.38, 73.46, 73.47, 73.1, 370; *F16D 65/02*
See application file for complete search history.

(56) References Cited

U.S. PATENT DOCUMENTS

| | | | |
|---|---|---|---|
| 4,084,666 A * | 4/1978 | Karasudani | 188/73.45 |
| 4,381,336 A | 4/1983 | Ostwald | |
| 5,168,964 A | 12/1992 | Shimmell | |
| 5,394,963 A | 3/1995 | Deane et al. | |
| 2005/0056496 A1 | 3/2005 | Reeves | |
| 2008/0017458 A1 | 1/2008 | Aydt et al. | |

FOREIGN PATENT DOCUMENTS

| | | |
|---|---|---|
| DE | 2533058 A1 | 2/1977 |
| DE | 2950660 A1 | 7/1981 |
| DE | 30 25 636 A1 | 2/1982 |
| DE | 3036985 A1 | 5/1982 |
| DE | 44 20 652 A1 | 12/1994 |
| DE | 196 47 999 A1 | 5/1998 |
| EP | 0 510 930 A1 | 10/1992 |
| EP | 0 725 697 B1 | 9/1997 |
| GB | 2 087 490 A | 5/1982 |
| GB | 2087490 A | 5/1982 |
| JP | 57156643 U | 10/1982 |
| JP | 62013832 A * | 1/1987 |
| JP | 62056630 A * | 3/1987 |
| JP | 62056632 A | 3/1987 |
| JP | 62093059 A * | 4/1987 |

(Continued)

OTHER PUBLICATIONS

German Patent Office, German Search Report in German Patent Application No. 10 2008 038 035.0 (Sep. 6, 2010).

*Primary Examiner* — Robert A Siconolfi
*Assistant Examiner* — Stephen Bowes
(74) *Attorney, Agent, or Firm* — Leydig, Voit & Mayer, Ltd.

(57) ABSTRACT

A brake caliper for a disk brake system of a motor vehicle, has a caliper body which is cast from a light metal alloy or from light metal, with a skeleton structure arranged inside the caliper body. The material of the skeleton structure has a higher modulus of elasticity than the material of the caliper body. The skeleton structure is cast into the caliper body so that the caliper body encases the skeleton structure.

9 Claims, 2 Drawing Sheets

FOREIGN PATENT DOCUMENTS

| | | | |
|---|---|---|---|
| JP | 63149436 A * | 6/1988 | |
| JP | H0431342 U | 3/1992 | |
| JP | 2002321038 A | 11/2002 | |
| JP | 2003184917 A * | 7/2003 | |
| JP | 2004050225 A | 2/2004 | |
| JP | 2005517878 A | 6/2005 | |
| JP | 2006142513 A | 6/2006 | |
| JP | 2006249994 A | 9/2006 | |
| JP | 2008025837 A | 2/2008 | |
| JP | 2008036704 A | 2/2008 | |
| WO | 95/12468 A1 | 5/1995 | |
| WO | 03/089169 A1 | 10/2003 | |

* cited by examiner

BRAKE CALIPER AND ASSOCIATED PRODUCTION METHOD

CROSS-REFERENCE TO RELATED APPLICATION

This application claims the priority, under 35 U.S.C. §119, of German application DE 10 2008 038 035.0, filed Aug. 16, 2008; the prior application is herewith incorporated by reference in its entirety.

BACKGROUND OF THE INVENTION

Field of the Invention

The present invention relates to a brake caliper for a disk brake system of a motor vehicle. The invention relates, moreover, to a method for the production of a brake caliper of this type.

Published, British patent application GB 2 087 490 A discloses a brake caliper made from aluminum, which has a reinforcing insert made from a steel material or from titanium. The reinforcing insert extends from a brake caliper bridge in a fork-like manner into side regions of the brake caliper.

Published, non-prosecuted German patent application DE 196 47 999 A1 discloses an aluminum-based brake caliper which has a stiffening element made from a metal matrix composite material.

International patent disclosure WO 03/089169 A1 discloses a further aluminum-based brake caliper configured as a light metal casting into which a reinforcing material, preferably formed from ceramic fibers, is embedded.

European patent EP 0 725 697 B1 discloses a method for the production of a brake caliper, in which a bridge portion and an outer arm portion of the brake caliper are cast and an insert made from an iron-based alloy is used.

Further cast aluminum-based brake calipers with a reinforcing insert are known from published, non-prosecuted German patent application DE 29 50 660 A1 and from published, European patent application EP 0 510 930 A1, corresponding to U.S. Pat. No. 5,168,964.

Published, non-prosecuted German patent application DE 44 20 652 A1, corresponding to U.S. Pat. No. 5,394,963, discloses a brake caliper for a disk brake in which an additional component is embedded into a caliper body. This additional component is in this case cast into the caliper body, thus giving rise to a composite cast body. The cast-in component in this case serves as a reinforcement for increasing the strength of the caliper body and has to be held in position in the casting mold, using a multiplicity of positioning wires.

Further cast brake calipers with reinforcing inserts are known from published, non-prosecuted German patent application DE 25 33 058 A1 and from published, non-prosecuted German patent application DE 30 25 636 A1, corresponding to U.S. Pat. No. 4,381,336.

SUMMARY OF THE INVENTION

It is accordingly an object of the invention to provide a brake caliper and an associated production method which overcome the above-mentioned disadvantages of the prior art methods and devices of this general type, which is distinguished, in particular, in that, along with a comparatively low weight, the brake caliper possesses comparatively high rigidity together with sufficient strength.

With the foregoing and other objects in view there is provided, in accordance with the invention a brake caliper for a disk brake system of a motor vehicle. The brake caliper includes a caliper body cast from one of a light metal alloy and a light metal; and a skeleton structure disposed inside the caliper body. The skeleton structure is formed from a material having a higher modulus of elasticity than a material of the caliper body. The skeleton structure is cast into the caliper body, so that the caliper body encases the skeleton structure.

The invention is based on the general idea of equipping the brake caliper with a skeleton structure around which is cast a caliper body formed from a light metal or a light metal alloy, the material of the stiffening skeleton structure having a higher modulus of elasticity than the material of the caliper body. As a result, a relatively lightweight composite cast body is produced which is distinguished by comparatively high resistivity. This is attributable, in particular, to the fact that the skeleton structure extends in all the regions of the caliper body which are essential for rigidity, to be precise in lateral cheek portions and in a bridge portion connecting the cheeks. The skeleton structure therefore permeates virtually the entire caliper body.

Moreover, the proposed brake caliper can be produced particularly simply, since the light metal material of the caliper body can be cast as an insert into a casting mold having the skeleton structure. The material of the caliper body expediently has a lower density than the material of the skeleton structure.

Advantageously, the skeleton structure may be formed from an iron alloy, for example steel, or of iron. A skeleton structure of this type combines a comparatively high modulus of elasticity and beneficial material costs with good handling in production terms.

Preferably, the skeleton structure may be formed from a metal matrix composite material, where the matrix used may be, for example, magnesium, but preferably aluminum. The matrix may in this case be present as an elementary metal or in the form of an alloy. For example, ceramic particles, short fibers or carbon-based fibers may be used as the reinforcing phase. A skeleton structure made from a metal matrix composite material affords high rigidity and is distinguished by a low weight, particularly as compared with iron alloys.

Advantageously, the caliper body may be formed from an aluminum alloy or of aluminum. A caliper body of this type is particularly lightweight and is in this case distinguished by good corrosion resistance.

According to an advantageous embodiment, the caliper body may have two cheeks extending parallel to one another and a plurality of webs extending transversally with respect to the cheeks and connecting the cheeks to one another. An embodiment is particularly advantageous, then, in which the skeleton structure has two longitudinal members which extend parallel to one another and are embedded in each case into one of the cheeks of the caliper body, and also a plurality of crossmembers which extend transversely with respect to the longitudinal members and connect the longitudinal members to one another and which are in each case embedded into one of the webs of the caliper body. By virtue of this type of construction, the skeleton structure extends through all the load-bearing components of the caliper body, to be precise through the cheeks and through the webs for connecting the cheeks. As a result, the cheeks and the webs are even stiffened in each case in themselves by the longitudinal members or by the cross-members of the skeleton structure. Moreover, since the cross-members connect the longitudinal members to one another within the skeleton structure, the skeleton structure leads to a stiffening of the entire caliper body, that is to say, in particular, also of the connections between the cheeks via the webs.

An embodiment is particularly advantageous in which the skeleton structure is produced integrally in one piece, specifically preferably as a casting. Alternatively, an embodiment may also basically be envisaged in which the skeleton structure is composed of a plurality of elements. For reasons of cost, it may be expedient to produce a skeleton structure from one or more sheet metal parts.

The skeleton structure may advantageously have a precoating, for example a conversion coating. Undesirable reactions between the material of the skeleton structure and the material of the caliper body can be avoided in this way.

According to another advantageous embodiment, the brake caliper may have a plurality of anchorings which in each case connect a skeleton-side anchoring point positively to a body-side anchoring point. What is achieved by this type of construction is that via the anchorings, between the caliper body and skeleton structure, an additional intensive tie-up can be implemented, which improves the coupling of the two components of the brake caliper and contributes to an increased rigidity of the brake caliper.

Advantageously, the caliper body has an inner structure for the reception and/or guidance of hydraulic fluids. Thus, for example, lines for hydraulic fluids may be integrated into the brake caliper.

It would be appreciated that the features mentioned above and those yet to be explained below can be used not only in the combinations specified in each case, but also in other combinations or alone, without departing from the scope of the present invention.

Other features which are considered as characteristic for the invention are set forth in the appended claims.

Although the invention is illustrated and described herein as embodied in a brake caliper and an associated production method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
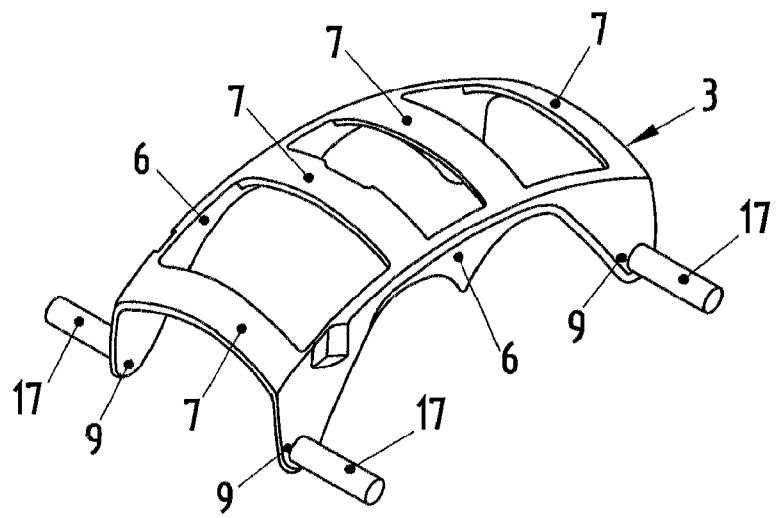
FIGS. 1 to 5 are diagrammatic, perspective views of a brake caliper, but in different production states, according to the invention.
Figure 2:
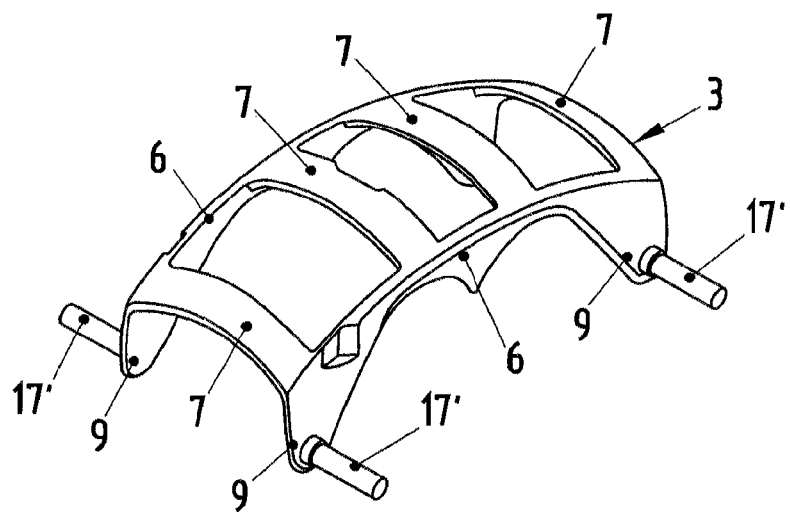

In the drawings, the same reference symbols relate to identical or similar or functionally identical components. Referring now to the figures of the drawing in detail and first, particularly, to FIGS. 1-5 thereof, there is shown a brake caliper 1 for a disk brake system, otherwise not shown, of a motor vehicle and includes a caliper body 2, illustrated transparently in FIGS. 3 to 5, and a skeleton structure 3. The caliper body 2 is configured as a cast component and is formed from a light metal or of a light metal alloy. It is, in particular, an aluminum component. In contrast to this, the skeleton structure 3 may be formed from an iron material or of an iron alloy, in particular of steel or of a steel alloy. The skeleton body 3 is arranged inside the caliper body 2. This is achieved in that that the caliper body 2 is cast onto the skeleton structure 3, specifically in such a way that the caliper body 2 encases the skeleton structure 3. That is to say, the skeleton structure 3 is cast into the caliper body 2.

The skeleton structure 3 has a higher modulus of elasticity than the caliper body 2, the latter being characterized by comparatively low density. In preferred embodiments, for example, the following material combinations may be used: a skeleton structure 3 made from steel in conjunction with a caliper body 2 made from aluminum or from an aluminum alloy. A skeleton structure 3 made from a metal matrix composite material, preferably based on aluminum, in conjunction with a caliper body 2 made from aluminum or from an aluminum alloy. A skeleton structure 3 made from titanium or from a titanium alloy in conjunction with a caliper body 2 made from aluminum or from an aluminum alloy. A skeleton structure 3 made from steel in conjunction with a caliper body 2 made from magnesium or from a magnesium alloy. A skeleton structure 3 made from a metal matrix composite material, preferably based on aluminum, in conjunction with a caliper body 2 made from magnesium or from a magnesium alloy.

The brake caliper 1 is, in particular, a fixed caliper. Theoretically, however, the type of construction presented here can also be implemented in a floating caliper or stub caliper configuration.

The caliper body 2 has two cheeks 4 extending parallel to one another. In the installation state of the brake caliper 1, the two cheeks 4 surround a brake disk, not illustrated here, on both sides. Moreover, the caliper body 2 has a plurality of webs 5 extending transversely with respect to the cheeks 4. The webs 5 engage over an external margin of the brake disk in the installation state of the brake caliper 1 and connect the two cheeks 4 to one another. Four webs 5 of this type are provided in the example. It is clear that even more or fewer than 4 webs 5 of this type may be provided.

In the particular embodiment shown here, the skeleton structure 3 contains two longitudinal members 6 extending parallel to one another and also a plurality of crossmembers 7. The longitudinal members 6 are in this case embedded in each case into one of the cheeks 4 and bring about an intensive stiffening of the cheeks 4. The cross-members 7 extend transversely with respect to the longitudinal members 6 and connect the longitudinal members 6 to one another. Furthermore, the cross-members 7 are in each case embedded into one of the webs 5 and bring about an intensive stiffening of the respective web 5. The stiffening of the brake caliper 1 in all the essential regions gives rise to a significantly increased overall rigidity of the brake caliper 1. Load absorption takes place essentially by the skeleton structure 3, with the result that the operational strength of the brake caliper 1 is increased.

According to the preferred embodiment shown here, the skeleton structure 3 is configured as a casting. The skeleton structure 3 is correspondingly produced integrally in one piece. An embodiment is also basically possible in which the skeleton structure 3 is composed of a plurality of elements produced separately from one another. Elements of this type are, for example, the longitudinal members 6 and the cross-members 7.

Figure 5:
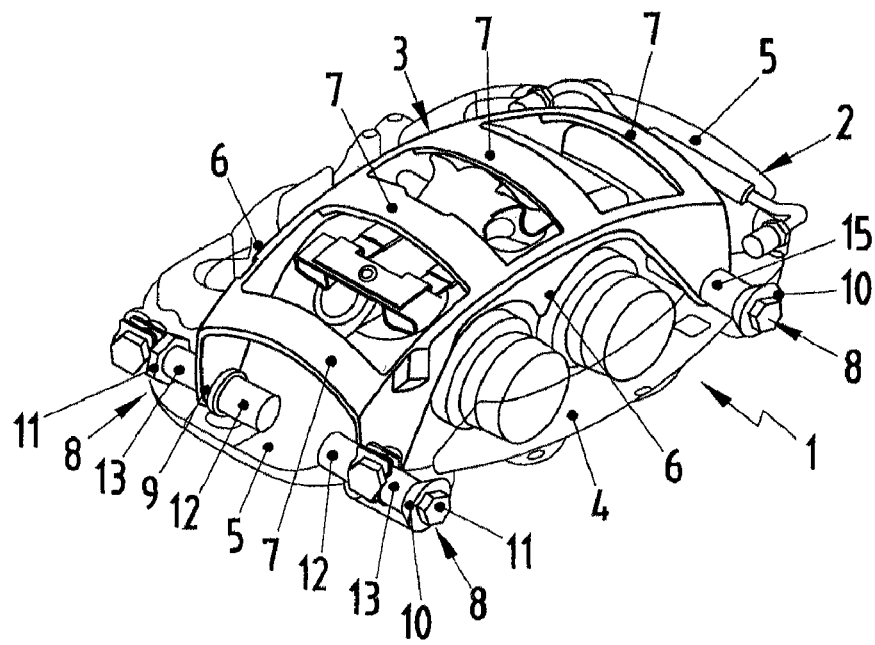

Moreover, the brake caliper 1 has a plurality of anchorings 8 which can be seen particularly in FIG. 5. Four anchorings 8 of this type are provided in the example. Each anchoring 8 connects a skeleton-side anchoring point 9, formed on the skeleton structure 3, positively to a body-side anchoring point 10 formed on the caliper body 2.

In the preferred embodiment shown here, the respective anchoring 8 has an anchor bolt 11, an anchor nut 12 and an anchor sleeve 13. The respective anchor sleeve 13 is in this case inserted into the caliper body 2 in such a way that it can be supported on the skeleton structure 3. For this purpose, the caliper body 2 contains for the respective anchoring 8 a sleeve orifice 14 which extends as far as the skeleton structure 3. The sleeve orifice 14 in this case forms virtually the body-side anchoring point 10. Formed on the skeleton structure 3 in alignment with this sleeve orifice 14 is a through orifice 15 which forms virtually the skeleton-side anchoring point 9. Within the respective anchoring 8, then, the anchor bolt 11 is mounted such that it penetrates through the anchor sleeve 13, which is inserted into the associated sleeve orifice 14, and the through orifice 15 and engages into the anchor nut 12. For this purpose, the caliper body 2 is equipped, opposite the respective sleeve orifice 14, with a further orifice which is designated below as a nut orifice 16. The nut orifice 16 may in this case, in particular, be configured such that, through this nut orifice 16, the anchor nut 12 can pass through the caliper body 2 as far as the skeleton structure 3, so that the anchor nut 12 can be supported directly on the skeleton structure 3.

The respective anchoring 8 thus leads to a positive coupling of the skeleton-side anchoring point 9 to the body-side anchoring point 10. As a result, in the region of anchorings 8, an intensive connection 12 between the caliper body 2 and skeleton structure 3 can be implemented, thus improving the stiffening of the overall structure or of the brake caliper 1. It is particularly noteworthy for the embodiment shown here that the anchorings 8 are located in each case at the longitudinal ends of the longitudinal members 6 or of the cheeks 4, that is to say at the points where the highest forces are transmitted between the caliper body 2 and skeleton structure 3.

In the embodiment shown here, the anchor nuts 12 possess a cylindrical outer contour. In particular, they may be configured as a guide or holder of brake linings, not illustrated here. They thereby acquire an advantageous double function, thus simplifying a compact form of construction for the brake caliper 1.

The connection between the caliper body 2 and skeleton structure 3 is improved macrostructurally by the provision of bores and/or recesses and by the provision of projections, pins and/or anchors.

The connection between the caliper body 2 and skeleton structure 3 may be further improved by the provision of a microstructural surface anchoring. For this purpose, the skeleton structure 3, before being connected to the caliper body 2, may be abrasive-blasted and/or, during the casting of the skeleton structure 3, a granularity can be set in a directed manner.

In order to lower the risk of corrosion at exposed points, the skeleton structure 3 may be manufactured from higher-grade steel.

A preferred method for the production of the brake caliper 1 is now explained in more detail.

According to FIG. 1, first, the skeleton structure 3 is produced, that is to say, for example, is cast from the respective iron material or steel.

Alternatively to the casting method, the skeleton structure 3 may also be produced by laser sintering. In a further alternative, the skeleton structure may also be formed from one or more sheet metal parts. The one or more sheet metal parts are first stamped and then formed. To produce the skeleton structure 3, it is also possible to cut a profile part preferably by a laser method, the profile part preferably being of tubular design. After cutting, if appropriate, one or more further forming processes are carried out. The skeleton structure 3 may have a precoating, for example a conversion coating.

Figure 3:
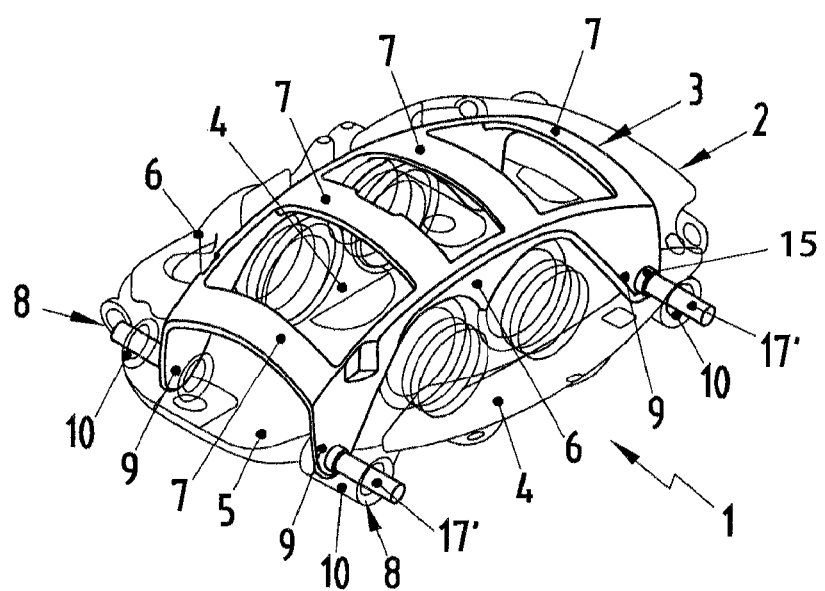
Figure 4:
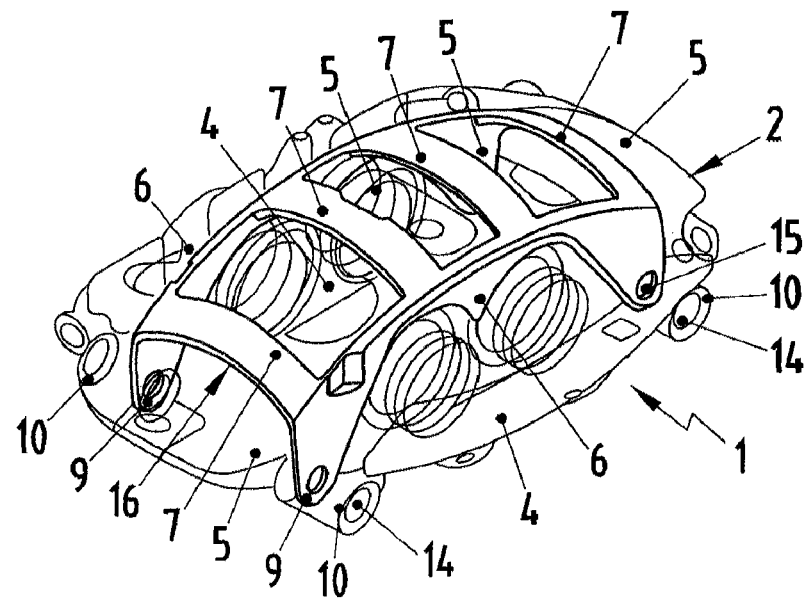

After the production of the skeleton structure 3, then, at a later time, according to FIG. 3 the caliper body 2 made from the respective light metal material is cast onto the skeleton structure 3 in such a way that the skeleton structure 3 is subsequently embedded into the caliper body 2. To avoid cold runners, it may in this case be expedient to heat skeleton structure 3 before the casting of the caliper body 2, for example to approximately 300° C.

The casting of the skeleton structure 3 in this case expediently takes place in a first casting die, not shown here, while the casting of the caliper body 2 takes place in a second casting die, not shown here, which differs from the first casting die. The previously cast skeleton structure 3 is inserted as a core into the second casting die before the caliper body 2 is cast.

As may be gathered particularly from FIG. 1, during the casting of the skeleton structure 3, supporting slugs 17, for example four supporting slugs 17, may be shaped integrally on the skeleton structure 3. The supporting slugs 17 serve, during the casting of the caliper body 2, for positioning the skeleton structure 3 which in this case serves as an insert or core. For example, the supporting slugs 17 can be used in the abovementioned second casting die in order to position the skeleton structure 3 used as an insert or core. According to FIG. 2, in an intermediate step, the supporting slugs 17 may be machined, thus making it simpler to adhere to predetermined, comparatively narrow position tolerances for the skeleton structure 3, serving as an insert or core, in the second casting die. The machined supporting slugs are configured in FIG. 2 by 17'. After the caliper body 2 has been cast around a skeleton structure 3, there is the situation shown in FIG. 3. In a next machining step, according to FIG. 4, the supporting slugs 17 and 17' are removed after the casting of the caliper body 2. Furthermore, in the region of the removed supporting slugs 17', the abovementioned skeleton-side and body-side anchoring points 9, 10 are produced, with the aid of which the anchorings 8 can be implemented. For example, in this case, the through orifices 15, the sleeve orifices 14 and, if appropriate, the nut orifices 16, may be produced.

According to FIG. 5, subsequently, the anchorings 8 may be implemented. Further components of the brake caliper 1 may likewise be mounted, such as, for example, hydraulic lines and hydraulic pistons for actuating the brake linings, not shown.

The casting method for producing the skeleton structure 3 may take the form, in particular of a thin-walled casting method which is distinguished by comparatively small wall thicknesses. The wall thicknesses within the skeleton structure 3 may lie, for example, between approximately 1.5 mm and approximately 6.0 mm. With the aid of the thin-walled casting method, even wall thicknesses within the skeleton structure 3 of, for example, 1.0 to 1.5 mm can be achieved. In this case, the skeleton structure 3 may also have, in regions, markedly greater wall thicknesses, particularly in the region of the supporting slugs 17.

After the caliper body 2 has been cast onto the skeleton structure 3, it is basically possible to carry out a recompression method. The composite structure between the caliper body 2 and skeleton structure 3 can thereby be improved. Casting defects can be reduced or eliminated and gaps can be avoided. Suitable recompression methods are, for example, forging and/or vacuum pressing.

The invention claimed is:

1. A brake caliper for a disk brake system of a motor vehicle, the brake caliper comprising:
   a caliper body cast from one of a light metal alloy or a light metal, said caliper body having two cheeks extending parallel to one another and over a length of the brake caliper, said caliper body further having a plurality of webs extending transversely with respect to said cheeks and connecting said cheeks to one another on an end side;
   a skeleton structure cast into said caliper body and said caliper body encasing said skeleton structure, said skeletal structure being a cap shaped covering having two longitudinal members extending parallel to one another, and in each case said longitudinal members being embedded into one of said cheeks of said caliper body, said skeleton structure further having a plurality of cross-members extending transversely with respect to said longitudinal members and connecting said longitudinal members to one another, said cross-members in each case being embedded into one of said webs; and
   a plurality of anchorings connecting said caliper body with said skeleton structure, said anchorings in each case positively connecting an anchoring point of said skeleton structure with an anchoring point of said caliper body, each of said anchorings having an anchor bolt, an anchor nut and an anchor sleeve, said anchor bolt penetrating through said anchor sleeve, inserted into said caliper body and supported on said skeleton structure; said skeleton body having a through orifice formed therein into which said anchor nut engages, said anchor nut being at least one of capable of being supported on said skeleton structure or of passing through said caliper body.

2. The brake caliper according to claim 1, wherein said skeleton structure is composed of a plurality of elements.

3. The brake caliper according to claim 1, wherein said skeleton structure is formed from a material having a higher modulus of elasticity than a material of said caliper body.

4. The brake caliper according to claim 1, wherein said skeleton structure is formed from one of an iron alloy and iron.

5. The brake caliper according to claim 1, wherein said skeleton structure is formed from a matrix composite material.

6. The brake caliper according to claim 1, wherein said caliper body is formed from one of an aluminum alloy and aluminum.

7. The brake caliper according to claim 1, wherein a material forming said caliper body has a lower density than a material forming said skeleton structure.

8. The brake caliper according to claim 1, wherein said caliper body has an inner structure for at least one of a reception of hydraulic fluids and a guidance of the hydraulic fluids.

9. The brake caliper according to claim 1, wherein said skeleton structure is configured as a casting produced integrally in one piece.

* * * * *